US008064664B2

(12) United States Patent
Suri et al.

(10) Patent No.: US 8,064,664 B2
(45) Date of Patent: Nov. 22, 2011

(54) ALIGNMENT METHOD FOR REGISTERING MEDICAL IMAGES

(75) Inventors: Jasjit S. Suri, Roseville, CA (US); Dinggang Shen, Cherry Hill, NJ (US); Dinesh Kumar, Grass Valley, CA (US)

(73) Assignee: Eigen, Inc., Grass Valley, CA (US)

( * ) Notice: Subject to any disclaimer, the term of this patent is extended or adjusted under 35 U.S.C. 154(b) by 1025 days.

(21) Appl. No.: 11/874,656

(22) Filed: Oct. 18, 2007

(65) Prior Publication Data

US 2008/0095422 A1 Apr. 24, 2008

Related U.S. Application Data

(60) Provisional application No. 60/829,929, filed on Oct. 18, 2006.

(51) Int. Cl.
G06K 9/00 (2006.01)
G06K 9/32 (2006.01)
(52) U.S. Cl. .................................... 382/128; 382/294
(58) Field of Classification Search .................. 382/294, 382/128
See application file for complete search history.

(56) References Cited

U.S. PATENT DOCUMENTS

| 5,282,472 A | 2/1994 | Companion et al. |
| 5,320,101 A | 6/1994 | Faupel et al. |
| 5,383,454 A | 1/1995 | Bucholz |
| 5,398,690 A | 3/1995 | Batten et al. |
| 5,454,371 A | 10/1995 | Fenster et al. |
| 5,531,520 A | 7/1996 | Grimson et al. |
| 5,562,095 A | 10/1996 | Downey et al. |
| 5,611,000 A * | 3/1997 | Szeliski et al. ............. 382/294 |
| 5,810,007 A | 9/1998 | Holupka et al. |
| 5,842,473 A | 12/1998 | Fenster et al. |
| 5,951,475 A * | 9/1999 | Gueziec et al. ............. 600/425 |
| 6,092,059 A | 7/2000 | Straforini et al. |
| 6,171,249 B1 | 1/2001 | Chin et al. |
| 6,238,342 B1 | 5/2001 | Feleppa et al. |
| 6,251,072 B1 | 6/2001 | Ladak et al. |
| 6,261,234 B1 | 7/2001 | Lin |
| 6,268,611 B1 * | 7/2001 | Pettersson et al. ......... 250/559.3 |

(Continued)

FOREIGN PATENT DOCUMENTS

WO 0014668 3/2000

(Continued)

OTHER PUBLICATIONS

Kabus, S. et al., "B-Spline Registration of 3D Images with Levenberg-Marquardt Optimization", 2004, Medical Imaging 2004: Image Processing, Proceedings of the SPIE, vol. 5370, pp. 304-313.*

(Continued)

Primary Examiner — Jason M Repko
Assistant Examiner — Gandhi Thirugnanam
(74) Attorney, Agent, or Firm — Marsh Fischmann & Breyfogle LLP

(57) ABSTRACT

Systems and method are provided for registering medical images to reduce movement between the images. In one arrangement, a hierarchical image registration is performed where regions of the largest differences between images are identified and utilized to drive the deformation of one of the images. Such regions are identified in one arrangement by determining intensities and gradient magnitudes for corresponding regions of the images. In another arrangement, a multi-resolution registration strategy is applied.

9 Claims, 8 Drawing Sheets

U.S. PATENT DOCUMENTS

| | | | |
|---|---|---|---|
| 6,298,148 B1 | 10/2001 | Cline et al. | |
| 6,334,847 B1 | 1/2002 | Fenster et al. | |
| 6,342,891 B1 | 1/2002 | Fenster et al. | |
| 6,351,660 B1 | 2/2002 | Burke et al. | |
| 6,360,027 B1 | 3/2002 | Hossack et al. | |
| 6,385,332 B1* | 5/2002 | Zahalka et al. | 382/128 |
| 6,423,009 B1 | 7/2002 | Downey et al. | |
| 6,447,477 B2 | 9/2002 | Burney et al. | |
| 6,500,123 B1 | 12/2002 | Holloway et al. | |
| 6,561,980 B1 | 5/2003 | Gheng et al. | |
| 6,567,687 B2 | 5/2003 | Front et al. | |
| 6,610,013 B1 | 8/2003 | Fenster et al. | |
| 6,611,615 B1 | 8/2003 | Christensen | |
| 6,674,916 B1 | 1/2004 | Deman et al. | |
| 6,675,032 B2 | 1/2004 | Chen et al. | |
| 6,675,211 B1 | 1/2004 | Mamaghani et al. | |
| 6,689,065 B2 | 2/2004 | Aksnes et al. | |
| 6,778,690 B1 | 8/2004 | Ladak et al. | |
| 6,824,516 B2 | 11/2004 | Batten et al. | |
| 6,842,638 B1 | 1/2005 | Suri et al. | |
| 6,852,081 B2 | 2/2005 | Sumanaweera et al. | |
| 6,909,792 B1 | 6/2005 | Carrott et al. | |
| 6,952,211 B1 | 10/2005 | Cote et al. | |
| 6,985,612 B2 | 1/2006 | Hahn | |
| 7,004,904 B2 | 2/2006 | Chalana et al. | |
| 7,008,373 B2 | 3/2006 | Stoianovici et al. | |
| 7,039,216 B2 | 5/2006 | Shum et al. | |
| 7,039,239 B2 | 5/2006 | Loui et al. | |
| 7,043,063 B1 | 5/2006 | Noble et al. | |
| 7,095,890 B2 | 8/2006 | Paragios et al. | |
| 7,119,810 B2 | 10/2006 | Sumanaweera et al. | |
| 7,139,601 B2 | 11/2006 | Bucholz et al. | |
| 7,148,895 B2 | 12/2006 | Konishi et al. | |
| 7,155,316 B2 | 12/2006 | Sutherland et al. | |
| 7,162,065 B2 | 1/2007 | Ladak et al. | |
| 7,167,760 B2 | 1/2007 | Dawant et al. | |
| 7,225,012 B1 | 5/2007 | Susil et al. | |
| 7,274,811 B2 | 9/2007 | Sirohey et al. | |
| 7,302,092 B1 | 11/2007 | Fenster et al. | |
| 7,362,920 B2* | 4/2008 | Xu et al. | 382/294 |
| 7,372,984 B2* | 5/2008 | Dickinson et al. | 382/131 |
| 7,397,934 B2* | 7/2008 | Bloch et al. | 382/128 |
| 7,403,646 B2 | 7/2008 | Sato | |
| 2003/0000535 A1 | 1/2003 | Galloway, Jr. et al. | |
| 2003/0135115 A1 | 7/2003 | Burdette et al. | |
| 2003/0216631 A1* | 11/2003 | Bloch et al. | 600/407 |
| 2004/0210133 A1 | 10/2004 | Nir | |
| 2005/0041842 A1* | 2/2005 | Frakes et al. | 382/128 |
| 2005/0159676 A1 | 7/2005 | Taylor et al. | |
| 2005/0190189 A1 | 9/2005 | Chefd'hotel et al. | |
| 2005/0197977 A1 | 9/2005 | Buck et al. | |
| 2005/0243087 A1 | 11/2005 | Aharon | |
| 2005/0249398 A1 | 11/2005 | Khamene et al. | |
| 2005/0249434 A1* | 11/2005 | Xu et al. | 382/294 |
| 2005/0254708 A1* | 11/2005 | Jolly et al. | 382/173 |
| 2005/0259882 A1* | 11/2005 | Dewaele | 382/243 |
| 2006/0002601 A1* | 1/2006 | Fu et al. | 382/132 |
| 2006/0002630 A1* | 1/2006 | Fu et al. | 382/294 |
| 2006/0008179 A1* | 1/2006 | Fischer et al. | 382/294 |
| 2006/0013482 A1 | 1/2006 | Dawant et al. | |
| 2006/0034545 A1* | 2/2006 | Mattes et al. | 382/294 |
| 2006/0036162 A1 | 2/2006 | Shahidi et al. | |
| 2006/0079771 A1 | 4/2006 | Nir | |
| 2006/0164428 A1* | 7/2006 | Cook et al. | 345/581 |
| 2006/0171586 A1* | 8/2006 | Georgescu et al. | 382/173 |
| 2006/0197837 A1 | 9/2006 | Flath et al. | |
| 2006/0227131 A1 | 10/2006 | Schiwietz et al. | |
| 2006/0239519 A1* | 10/2006 | Nowinski et al. | 382/128 |
| 2006/0258933 A1 | 11/2006 | Ellis et al. | |
| 2007/0014446 A1 | 1/2007 | Sumanaweera et al. | |
| 2007/0014489 A1* | 1/2007 | Sun et al. | 382/294 |
| 2007/0040830 A1 | 2/2007 | Papageorgiou | |
| 2007/0098221 A1* | 5/2007 | Florin et al. | 382/103 |
| 2007/0116339 A1 | 5/2007 | Shen | |
| 2007/0116381 A1* | 5/2007 | Khamene | 382/276 |
| 2007/0189603 A1 | 8/2007 | Kasperkiewicz et al. | |
| 2007/0196007 A1* | 8/2007 | Chen et al. | 382/131 |
| 2007/0201611 A1 | 8/2007 | Pratx et al. | |
| 2007/0270687 A1 | 11/2007 | Gardi et al. | |
| 2008/0002870 A1 | 1/2008 | Farag et al. | |
| 2008/0095422 A1* | 4/2008 | Suri et al. | 382/131 |
| 2008/0123910 A1 | 5/2008 | Zhu | |
| 2008/0123927 A1 | 5/2008 | Miga et al. | |
| 2008/0170770 A1* | 7/2008 | Suri et al. | 382/128 |
| 2008/0232452 A1* | 9/2008 | Sullivan et al. | 375/232 |
| 2008/0247616 A1 | 10/2008 | Pescatore et al. | |
| 2008/0317383 A1* | 12/2008 | Franz et al. | 382/294 |
| 2009/0093715 A1 | 4/2009 | Downey et al. | |
| 2009/0097778 A1* | 4/2009 | Washburn et al. | 382/294 |
| 2009/0303252 A1* | 12/2009 | Hyun et al. | 345/643 |
| 2010/0067769 A1* | 3/2010 | Neemuchwala et al. | 382/132 |
| 2010/0239150 A1* | 9/2010 | Ishikawa et al. | 382/131 |
| 2010/0278451 A1* | 11/2010 | Spahn | 382/294 |

FOREIGN PATENT DOCUMENTS

| | | |
|---|---|---|
| WO | 2006089426 A1 | 8/2006 |
| WO | 2008062346 A1 | 5/2008 |
| WO | 2008124138 A1 | 10/2008 |

OTHER PUBLICATIONS

Tsoon, T., "Non-Rigid Registration of Contrast Enhanced Dynamic MR Mammography", 2004, National University of Singapore, pp. 18-61.*

Hill, D et al., "Medical Image Registration", 2001, Institue of Physics Publishing, Physics in Medicine and Biology, vol. 46, p. 1-46.*

Rueckert, D. et al. "Nonrigid Registration Using Free-Form Deformations: Application to Breast MR Images", 1999, IEEE Transactions on Medical Imaging, vol. 18, No. 8, p. 712-721.*

Forsey, D. et al., "Hierarchial B-Spline Refinement", 1988. Computer Graphics, vol. 22 No. 4, p. 205-212.*

Shen, D. et al., "Hammer: Hierarchical Attribute Matching Mechanism for Elastic Registration", 2002, IEEE Transactions on Medical Imaging, vol. 21, No. 11, p. 1421-1439.*

Xie, Zhiyong and Farin, Gerald, "Image Registration Using Hierarchical B-Splines", Feb. 2004, IEEE Transactions on Visualization and Computer Graphics, vol. 10 No. 1, p. 1-10.*

* cited by examiner

Figure 8

ALIGNMENT METHOD FOR REGISTERING MEDICAL IMAGES

CROSS REFERENCE TO RELATED APPLICATION

This application claims the benefit of the filing date of U.S. Provisional Application No. 60/829,929 entitled "Alignment Method For Images" having a filing date of Oct. 18, 2006, the contents of which are incorporated by reference herein.

BACKGROUND

Image-guided surgery (e.g. image guided biopsy) provides a surgeon with images during a surgical procedure such that the procedure is accurate and minimally invasive. In image-guided surgery, the surgeon observes the images while the operation is being carried out. In general, pre-operative medical images are acquired and analyzed to make a decision whether and/or how to perform a procedure. Once in the operation room, medical images are acquired again as the procedure is initiated. The surgeon(s) relies on accurate correspondence between the pre-operative images and the images acquired during the surgery. Due to motions of the patient and motion of internal anatomy due to bodily functions as well as due to surgical procedure, the images acquired during surgery often do not correspond well with the pre-operative images. Image registration may be performed on the two images to put them in same co-ordinate system. Image registration provides a point-wise correspondence between a pair of anatomical images such that every point in one image has a corresponding point in the other image. Therefore, image registration is an important part of interventional surgery as well as image-guided biopsy.

Image guided surgery may be used in 3-D ultrasound guided breast (or prostate) biopsies for collecting samples of abnormal tissues. During the procedure, 3-D ultrasound breast images are obtained and tissues appearing abnormal on ultrasound images are identified. A surgical needle is inserted into body and is guided to the abnormal regions for collecting sample of the tissue in that region. The extracted tissue is later examined by the pathologist to determine whether the tissue is malignant or benign and also the type and extent of malignancy. Due to patient motion and dynamic nature of image acquisition, the images have to be registered in real-time to guide the needle to the correct co-ordinates.

Image registration also finds application in serial radiation therapy, where a patient is delivered radiation dosage for cancer treatment over a period of time. In such cases, the time between the previous scan/image and the current scan/image can be of the order of weeks and there are numerous differences between the images acquired at the two temporally separated instants. In such cases, there is a need to align the current image with the previous image(s) to find corresponding structures as well as to determine dosage.

Registration is also useful in removing motion artifacts from DSA images during surgical intervention. DSA images are acquired as a movie constructed from projection X-ray images while a contrast enhancement dye is injected into the blood stream. Frames from the movie are acquired before the contrast enhancement agent reaches the field of view, and after it has reached the blood vessels in the field of view. The injected dye results in a significant enhancement of blood vessels and a digital subtraction is typically performed between the images with the dye and without dye to remove the background structures such that only blood vessels are visible. The subtraction images are called DSA (Digital Subtraction Angiography) images and are further enhanced to aid the surgeons during the interventional procedure. Due to movement of the background structures, however, the background structures show up as artifacts in the subtraction images, and get further enhanced after intensity enhancement. If the images are registered together as it is acquired in real-time, then the DSA output will contain only the blood vessels in the DSA images by matching the background structures together.

All these applications require the registration of a current medical image to a pre-operative medical image to be substantially real-time. Due to complex movements of tissue structure, the transformation can not be approximated using a model having a small degree of freedom, such as rigid and affine registrations. The transformation needs to have a large degree of freedom and a non-rigid elastic registration is required to better approximate the transformation. However, the elastic registrations take a long time to register the images and the overhead in terms of time taken are prohibitively high for most techniques. If an extremely accurate registration algorithm takes a long time while the patient is in operation and surgeons are waiting, such a method may not have any practical use.

SUMMARY

Accordingly, the Inventors have recognized that a new software architecture is needed where there is a trade-off between quality of registration and time taken so as to make the system feasible for real-world applications. In one arrangement, such a software architecture may include a registration technique that first minimizes the larger differences between images and then progressively improves local correspondences at a smaller scale. Such a 'hierarchical' structure may allow the surgical staff to determine the balance of quality depending upon the time available. Such a software architecture may be implemented in software and computer processing systems that are integrated into medical imaging devices and/or that are interconnected to the medical imaging devices and operative to receive data there from.

In one aspect, a new real-time registration method is provided that may be termed Hierarchical Deformable Image Registration. The method is fast, real-time and minimizes the correspondence error caused by movement of a patient and their local anatomy. The method may be applied to 2-D images and can be extended to 3-D images. In any application, the method is fast and can be used as a real-time application.

Aspects of hierarchical registration can summarized as (1) defining an attribute vector for each point in the image, (2) hierarchically selecting the image regions for performing the image matching during the registration procedure, by using a sub-neighborhood match strategy. In the Hierarchical Deformable Image Registration Algorithm, aspects of the above ideas were utilized. However, to make this image registration algorithm fast, at least two major changes are made, each of which is considered novel alone as well as in combination. First, a B-spline may be used to represent the deformation field, in order to produce the smooth deformation field without the need of point-wise deformation smoothing in each iterative registration procedure. Second, two simple features may be used to define the attribute vector for each point (e.g., pixel) in the image, i.e., image intensity and gradient. In a further aspect, the registration algorithm may be implemented by a multi-resolution framework, by using three resolutions such as low, middle, and high resolutions to speed the image registration. That is, when registering two images, they are first down-sampled to be low resolution images. Then, the registration is performed on these low resolution images. After completion of registration, the deformation fields estimated from the low resolution images are up-sampled and used as an initialization for the registration of next high resolution images. By repeating this procedure, registration for the high resolution images can be completed.

In one arrangement, the hierarchical selection of regions to perform image matches, can be explained by the following way. For example, according to the control points placed in an image space, each image can be separated into a number of regions. Then, for each region, image complexity can be measured and also the image matching degree in this region for the two images under registration. These image complexity and matching degree will tell which regions need to be optimized. By using this hierarchical deformation strategy, the speed of the registration algorithm can be improved. In another arrangement, a sub-sampling method may be used to speed up the finite differential method used for calculating the gradients of the energy functions.

The hierarchical image registration systems and methods (i.e., utilities) may be applied to any medical imaging system including digital subtraction angiography where a series of image scans are produced. The utilities may also be applied to provide real-time image registration for 3D ultrasound biopsy.

In one arrangement, the hierarchical image registration utilities use a dynamic region selection strategy that focuses on registering image regions with larger differences while retaining small deformation for image regions with small differences. This helps in faster matching of regions that have large differences and if further speed up is required, the utility can only focus on large differences and get an even better speed up so that only small intensity differences remain.

In another arrangement, the hierarchical image registration utilities utilize an adaptive classification of driving points. In this regard, the utilities adaptively classify control points applied to the image into two groups: the ones that drive the deformation and the ones that are fixed. This may be done in each iteration. The selection of the driving control points in an iteration may be performed by checking the image regions with larger local least squared errors and selecting these regions as driving regions.

In another arrangement, the hierarchical image registration utilities perform intensity and intensity gradient matching: In this regard, the registration utility uses not only the least square error of image intensities but also uses the least square error of images' gradient magnitudes as the image matching criteria. Most intensity based registration techniques use only local image intensities as the driving function. In the presented utilities, the magnitude of intensity gradient may be used as part of similarity cost such that the edges also have a driving force. This results in better matching of edges in the image than just using the intensity information.

In another arrangement, the hierarchical image registration utilities perform intensity normalization of input images. An intensity registration technique assumes that the corresponding regions have same intensities in the two images being registered together. This is not always the case, owing to system errors as well as different fluid concentration in various regions across the images. This problem can be fixed by normalizing the intensities of the images before they are registered.

In another arrangement, the hierarchical image registration utilities gradient magnitude computation over smoothed images. In this regard, gradient magnitudes of images may be calculated by first performing smoothing operation and then calculating the gradients of images. Smoothing is performed to ensure that the driving function is smooth, well behaved and is not over-sensitive to small local minima.

In another arrangement, the hierarchical image registration utilities perform optimization using finite differences and a gradient descent approach wherein a finite difference method and gradient descent method is used to optimize the objective function. Finite differences are used to approximate the derivatives in a discrete space. The gradient descent approach updates the transformation parameterization based on the direction and magnitude of gradient of cost function with respect to that parameter. In another arrangement, the hierarchical image registration utilities utilize multi-resolution approach in registration basis function. In this regard, efficient down-sample and up-sample for B-Spline-based deformation for multi-resolution registration is utilized. The deformation is represented using B-spline basis functions, which are smooth, have good localization properties and are easy and fast to compute. The numbers of b-splines represent the degrees of freedom in the deformation model. The degrees of freedom may be progressively increased where the b-spline is updated over a coarser grid first and the grid is refined as the number of b-splines is increased. Accordingly, this may allow inserting more and more control points at the same resolution.

BRIEF DESCRIPTION OF THE DRAWINGS

FIG. 8 illustrates removal of artifacts using the registration process.

DETAILED DESCRIPTION

Reference will now be made to the accompanying drawings, which assist in illustrating the various pertinent features of the various novel aspects of the present disclosure. Although the present invention will now be described primarily in conjunction with angiography utilizing X-ray imaging, it should be expressly understood that aspects of the present invention may be applicable to other medical imaging applications including, specifically, ultrasound imaging. In this regard, aspects of the invention may be performed using a number of different medical imaging modalities, including biplane X-ray/DSA, magnetic resonance (MR), computed tomography (CT), ultrasound, and various combinations of these techniques. In this regard, the following description is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain known modes of practicing the invention and to enable others skilled in the art to utilize the invention in such, or other embodiments and with various modifications required by the particular application(s) or use(s) of the present invention.

Figure 1:
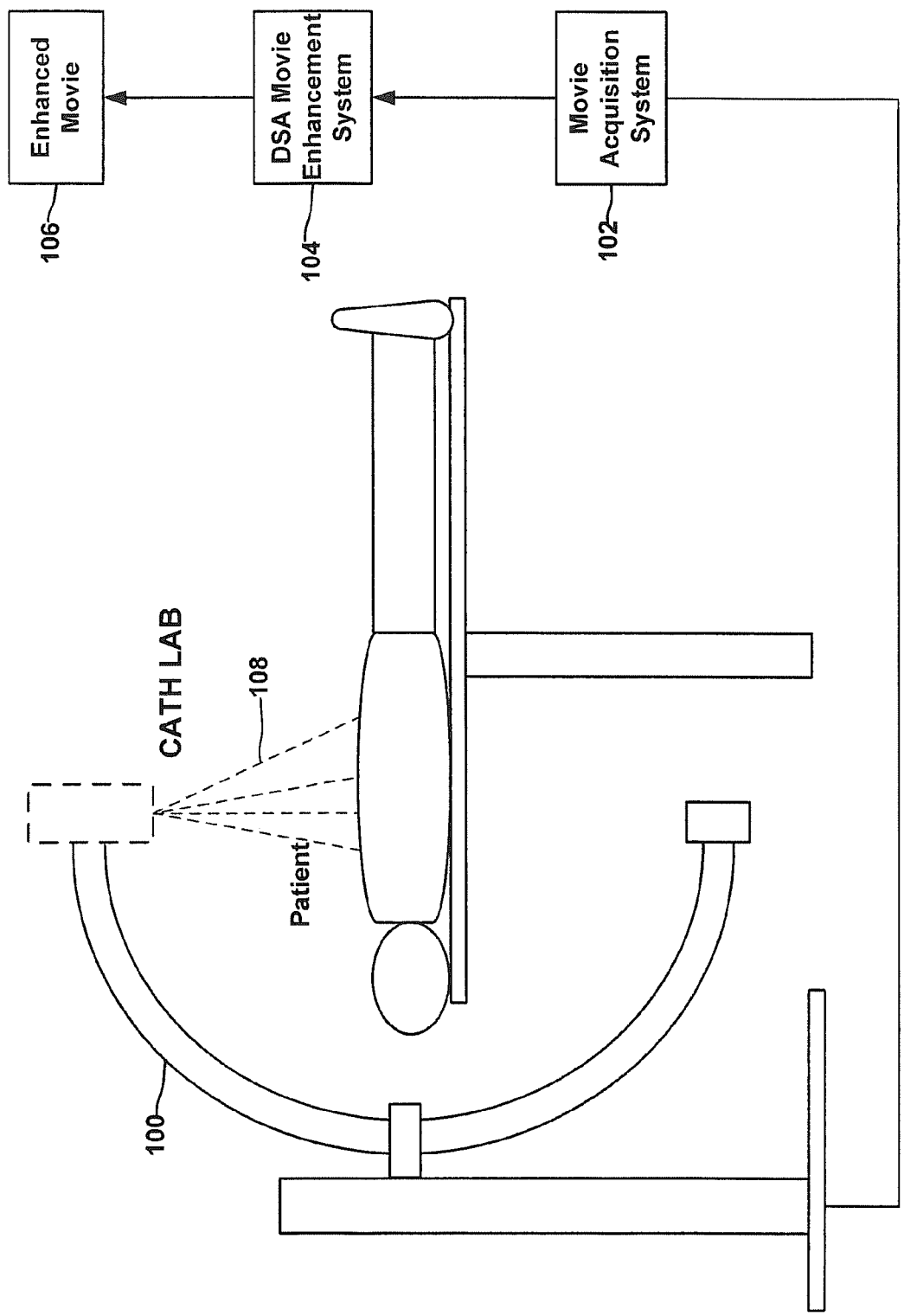
FIG. 1 illustrates an X-ray system used for a contrast media/dye injection procedure.

FIG. 1 shows one exemplary setup for a real-time imaging procedure for use during a contrast media/dye injection procedure. As shown, a patient is positioned on an X-ray imaging system 100 and an X-ray movie is acquired by a movie acquisition system (102). An enhanced DSA image, as will be more fully discussed herein, is generated by an enhancement system (104) for output to a display (106) that is accessible to (i.e., within view on an interventional radiologist. The interventional radiologist may then utilize the display to guide a catheter internally within the patient body to a desired location within the field of view of the images.

The projection images (e.g., CT images) are acquired at different time instants and consist of a movie with a series of frames before, during and after the dye injection. The series of frames include mask images that are free of contrast-enhancing dye in their field of view (108) and bolus images that contain contrast-enhancing dye in their field of view (108). That is, bolus frames are images that are acquired after injected dye has reached the field of view (108). The movie acquisition system (102) is operative to detect the frames before and after dye injection automatically to make feasible a real-time acquisition system. One approach for identifying frames before and after dye injection is to find intensity differences between successive frames, such that a large intensity difference is detected between the first frame after dye has reached the field of view (FOV) and the frame acquired before it. However, the patient may undergo some motion during the image acquisition causing such an intensity difference between even successive mask images. To avoid this, the movie acquisition system (102) may align successive frames together, such that the motion artifacts are minimized. The first image acquired after the dye has reached the FOV will therefore cause a high intensity difference with the previous frame not containing the dye in FOV. The subtraction image or 'DSA image' obtained by subtracting a mask frame from a bolus frame (or vice versa) will contain a near-zero value everywhere if both images belong to background.

Generally, the subtraction image or DSA image is obtained by computing a difference between pixel intensities of the mask image and the bolus image. The enhancement system (104) may then enhance the contrast of the subtraction image. Such enhancement may include rescaling the intensities of the pixels in the subtraction image and/or the removal of noise from the subtraction image. Once enhanced, the resulting real-time movie is displayed (106). These processes are more fully discussed herein.

Figure 2:
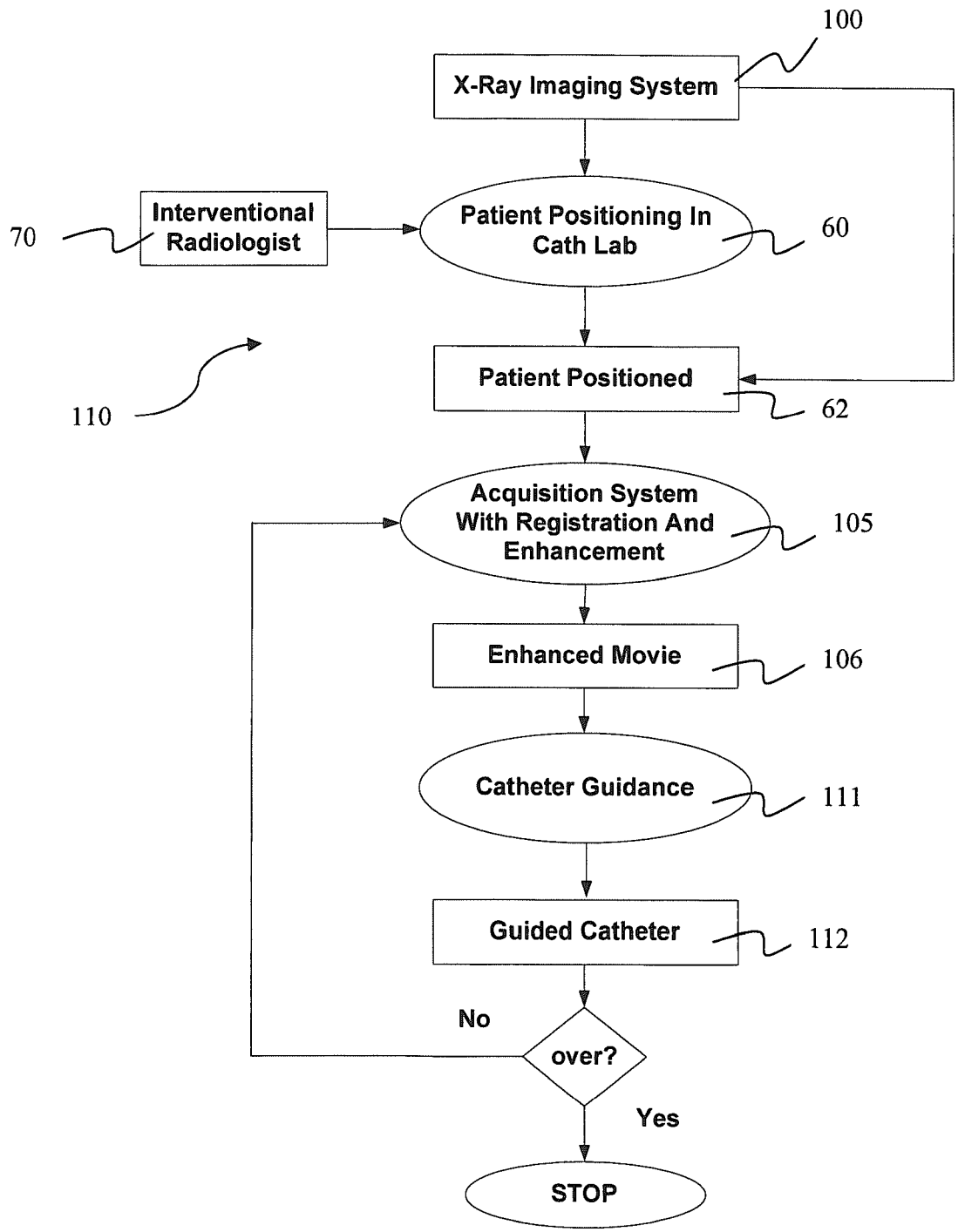
FIG. 2 illustrates process used with contrast media/dye injection procedure.

FIG. 2, illustrates one exemplary process flow diagram of an interventional procedure (110). Again, an X-ray imaging system (100) is used to acquire a number of projection images from a patient positioned (60) in a catheter lab by, for example an interventional radiologist (70). More specifically, the patient is positioned (60) in the X-ray imaging system (100) such that the area of interest lies in the field of view. Such a process of positioning may be repeated until the patient is properly positioned (62). A sequence of projection images are acquired and enhanced DSA image is created through the acquisition system with enhancement (105), which may include, for example, the movie acquisition system (102) and enhancement system (104) of FIG. 1. The enhanced image sequence is displayed (106) is used for a catheter guidance procedure (111) during the interventional procedure. Such guidance (111) may continue until the catheter is guided (112) one or more target locations where an interventional procedure is to be performed.

Figure 3:
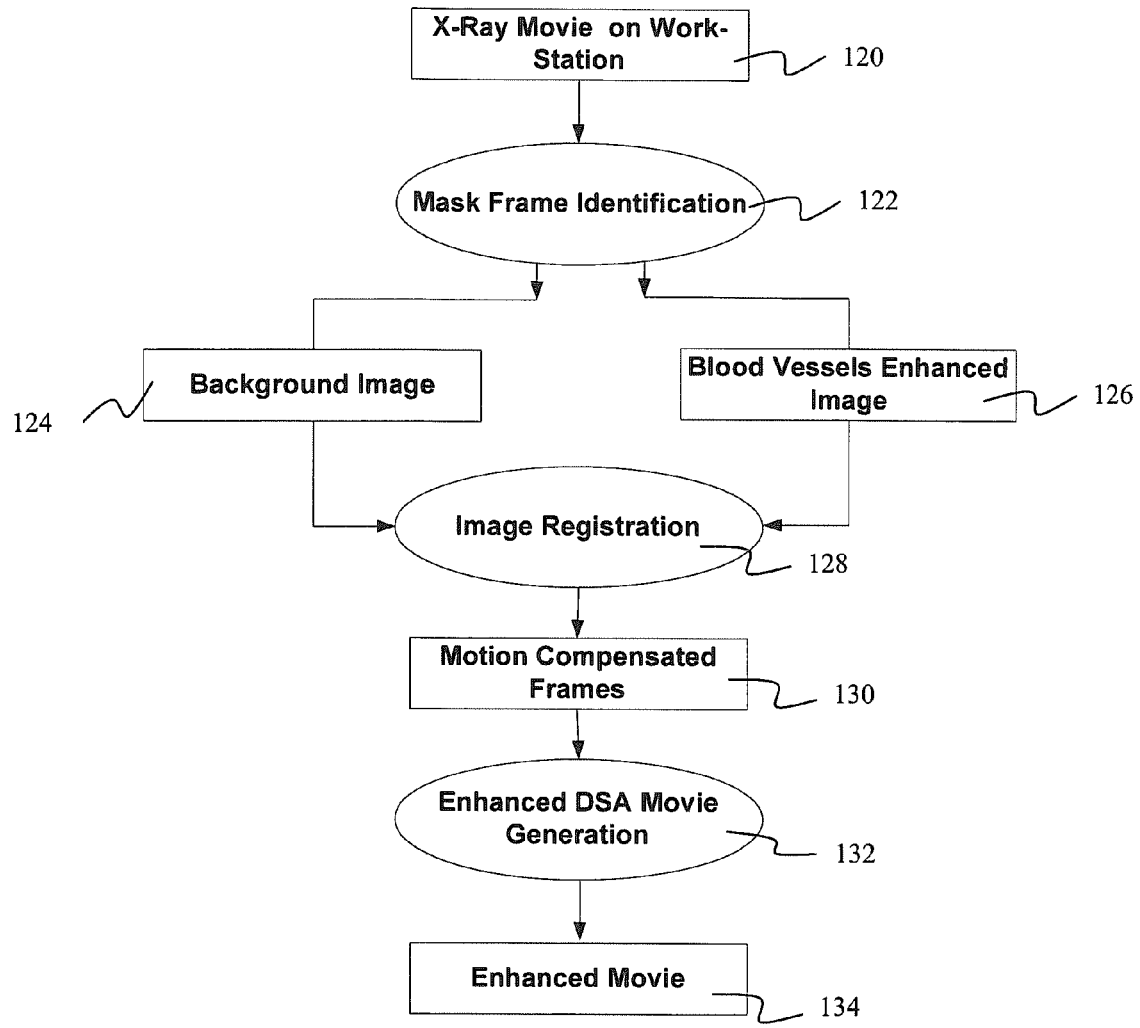
FIG. 3 illustrates a process for registering moving images with fixed images for a contrast media/dye injection procedure.

FIG. 3 shows the image acquisition system and the enhanced movie generation. The acquired movie (120) consists of images before (i.e., mask images) and after (bolus images) contrast enhancement dye injection. The mask frames are identified (122) based on, for example, intensity differences between successive images. In this regard, the mask frames define a background image (124) that corresponds to the image obtained before dye reaches the field of view and is treated as the moving image. The bolus frames define a blood vessel enhanced image (126). The moving image (124) is registered (128) into the frame of reference of the image frame (126) containing the dye enhanced blood vessels in the field of view. The background is then removed after subtraction from the current image resulting in a motion compensated image frames (130). These frames are enhanced (132) and output (134) for interventional radiologist.

Figure 4:
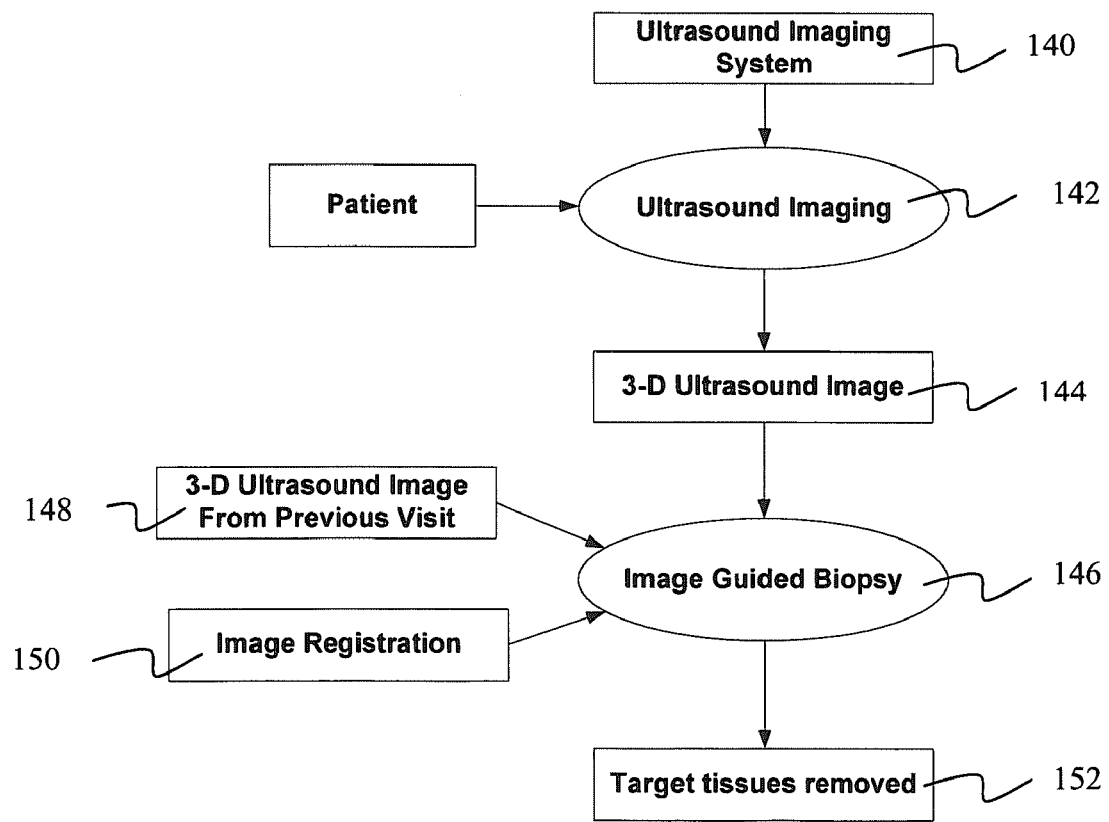
FIG. 4 illustrates a process for registering moving images with fixed images for an ultrasound imaging procedure.

FIG. 4 illustrates a similar process performed with a 3-D ultrasound imaging system. As shown, an ultrasound imaging system (140) is utilized to perform ultrasound imaging (142) of a structure of interest (e.g., breast, prostate, etc). The acquired ultrasound images are utilized to generate a current 3-D ultrasound image (144). As will be discussed herein, this current image forms the moving image. During an image guided biopsy procedure (146) a 3-D a previously acquired ultrasound image (148) is used for registered (150) with the current image. The surgeon uses the previously acquired image (148) as the reference image and registers it to the current image (144). The observations made on the previous image (i.e., fixed image) is directly transferred to the current moving image and the target issues are easily identifiable to make improve guidance to a predetermined location to perform, for example, biopsy removal (152).

Irrespective of the imaging modality utilized, corresponding points within the moving and fixed images must be registered. Presented herein is a new real-time registration method that is referred to as Hierarchical Deformable Image Registration. The method is fast, real-time and minimizes the correspondence error caused by movement of a patient and their local anatomy. The registration method is implemented in a similar fashion as introduced in a hierarchical attribute matching mechanism for elastic registration algorithm that was originally developed for 3D MR brain image registration and forester utilizes a B-Spline-based registration algorithm. The method may be applied to 2-D images and can be extended to 3-D images. In any application, the method is fast and can be used as a real-time application.

The hierarchical attribute matching mechanism for elastic registration algorithm can summarized as (1) defining an attribute vector for each point in the image, (2) hierarchically selecting the image regions for performing the image matching during the registration procedure, by using a sub-neighborhood match strategy. In the Hierarchical Deformable Image Registration method, aspects of the above ideas were utilized. However, to make this image registration algorithm fast, at least two major changes are made, each of which is more fully discussed herein. First, a B-spline may be used to represent the deformation field, in order to produce the smooth deformation field without the need of point-wise deformation smoothing in each iterative registration procedure. Second, two simple features may be used to define the attribute vector for each point (e.g., pixel) in the image, i.e., image intensity and gradient.

In a further implementation, the registration algorithm may be implemented by a multi-resolution framework, by using three resolutions such as low, middle, and high resolutions to speed the image registration. That is, when registering two images, they are first down-sampled to be low resolution images. Then, the registration is performed on these low resolution images. After completion of registration, the deformation fields estimated from the low resolution images are up-sampled and used as an initialization for the registration of next high resolution images. By repeating this procedure, registration for the high resolution images can be completed.

Figure 5:
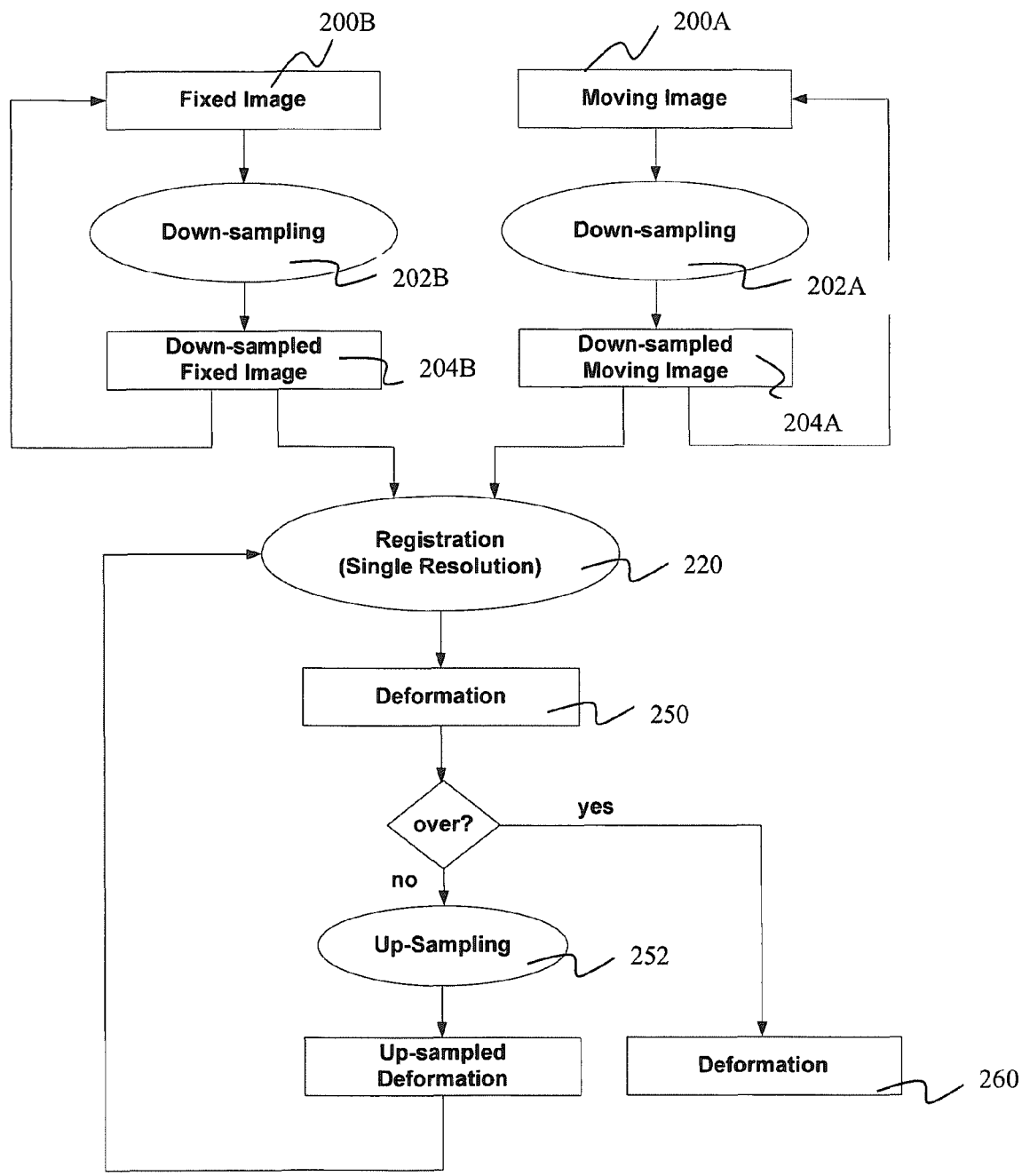
FIG. 5 illustrates a process for down-sampling and registering multi-resolution images.

FIG. 5 shows the registration setup. The moving and the fixed images 200A, 200B are supplied as the input to the registration module 220. In one implementation, the images 200A, 200B are down-sampled 202A, 202B to produce down sampled images 204A, 204B that are registered at a lower resolution. The resolution is increased progressively during the registration process. First, the images are registered at a lower resolution and then the registration is performed at a higher resolution to make the deformation 250 more accurate. That is, after registering the down sampled images, the images are up-sampled 252 and reregistered until a final deformation 260 is obtained at a desired resolution.

Figure 6:
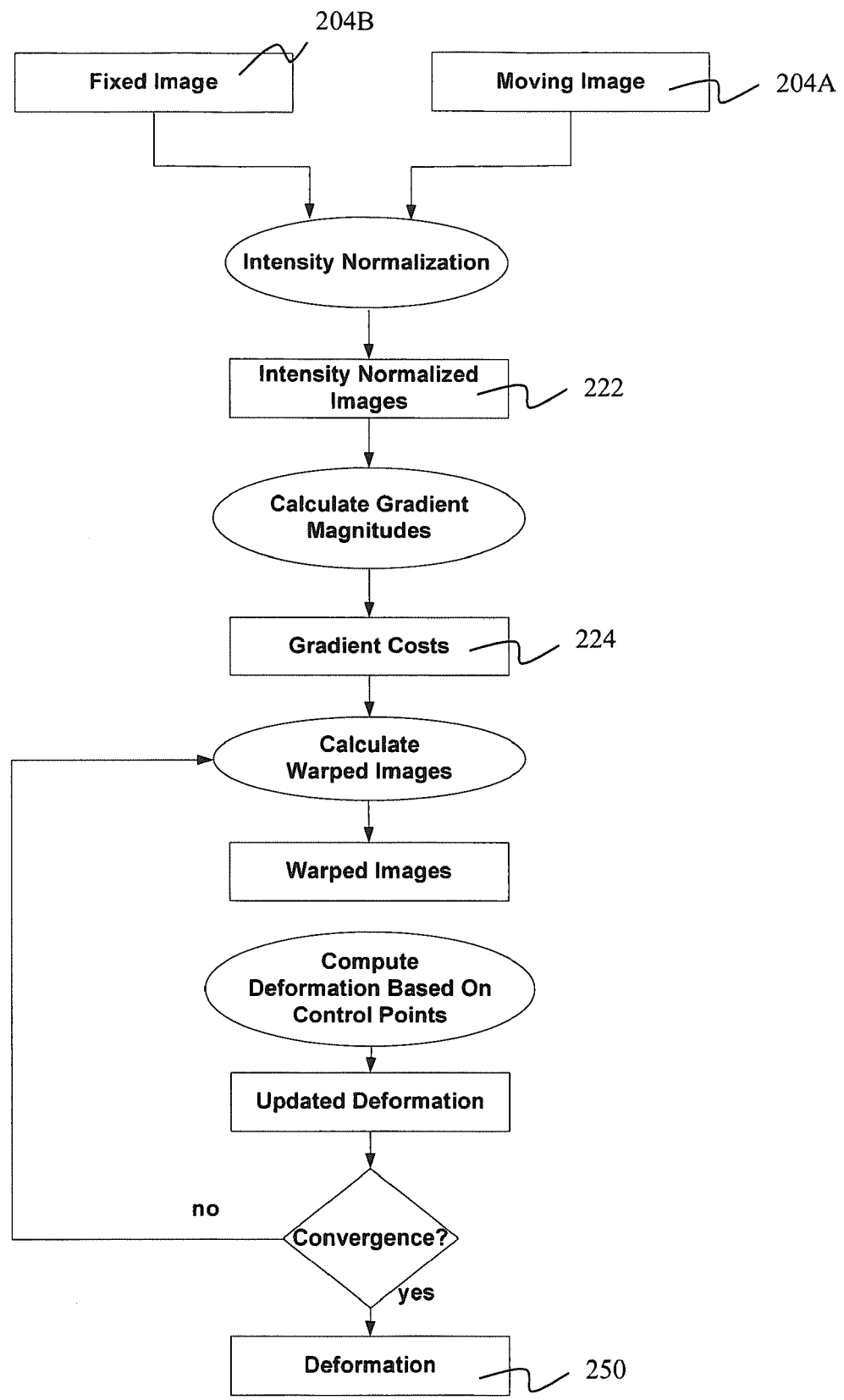
FIG. 6 illustrates a registration process.

The fixed image is registered with the moving image using real-time hierarchical attributes matching elastic registration method that uses multi-resolution architecture using B-spline basis functions as illustrated in FIG. 6. FIG. 6 shows the registration process 220 in detail. The down-sampled images 204A, 204B and deformation 250 from previous resolution levels are used to deform the images at the current resolution. The deformation fields are then updated using driving control points sequentially until the total cost converges and the updated deformation 250 is obtained. This registration method is more fully described in detail in the following sections.

Criteria of Registration

Figure 7:
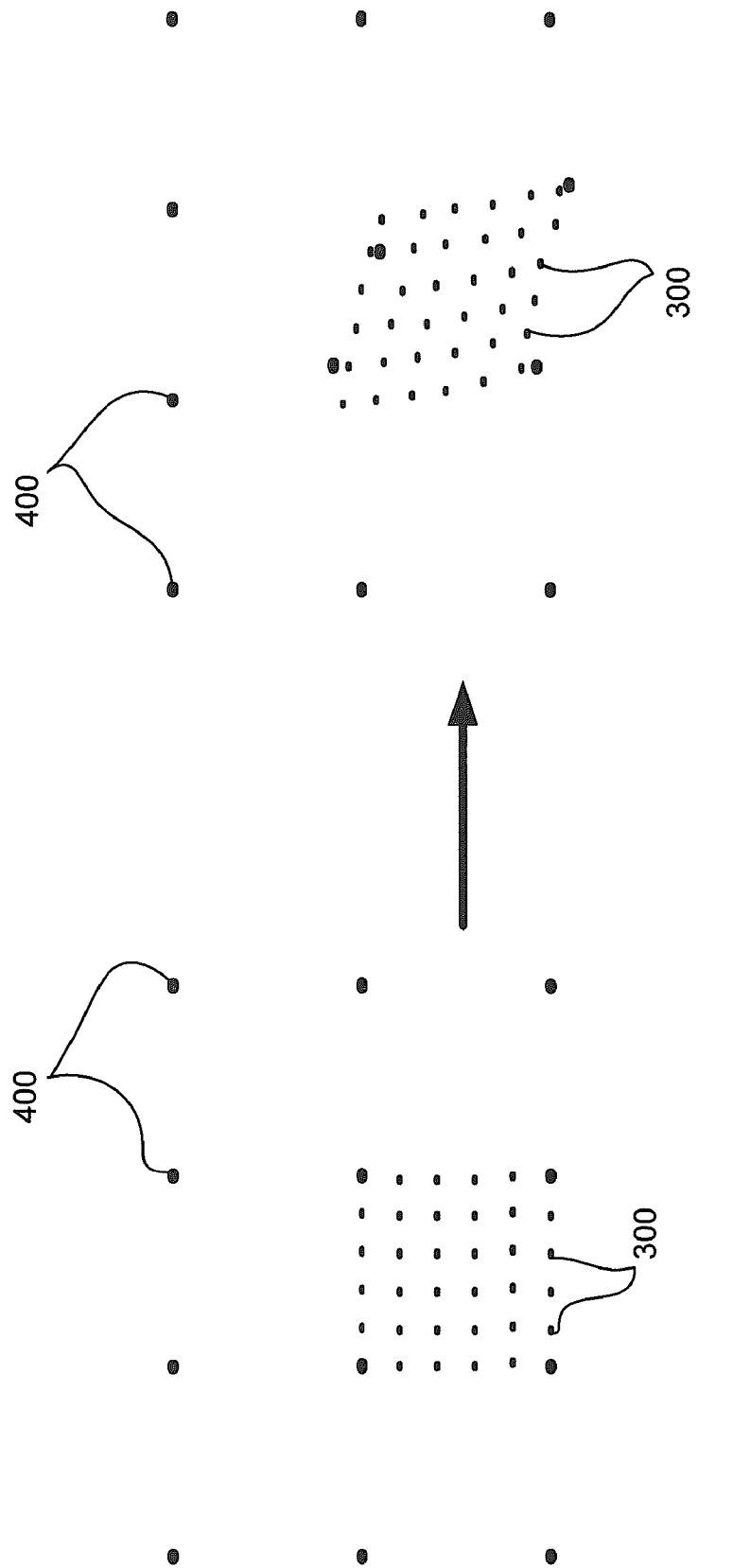
FIG. 7 illustrates control points used for deformation of an image.

Image registration provides a point-wise correspondence between a pair of similar anatomical images. FIG. 7 illustrates a pair of anatomically similar images including a moving image 200A and a fixed image 200B. The anatomical structure of each image is represented by the pixels 300 disposed within the control point grid, which is represented by the larger points 400. The control point grid may be applied to each image and may define a common frame of reference. Registration is performed as an optimization function, where the objective function is chosen such that its optimization leads to a better correspondence between the images. The registration is achieved by minimizing the following objective function:

$$E(T) = \sum_{v \in \Omega} (F(v) - M(T(v)))^2 + \lambda (|\nabla F(v)| - |\nabla M(T(v))|)^2 \quad (1)$$

where v is a pixel defined in the domain of the fixed image, and F(v) is the intensity of pixel v of the fixed image, and T( ) is the deformation of pixel v, and M(T(v)) is the intensity of the corresponding pixel in the moving image. $|\nabla I(\ )|$ and $|\nabla M(\ )|$ are the gradient magnitude of the fixed and moving images, respectively. $\lambda$ is the weighting between the intensity differences and the gradient magnitude differences between the two images. The first cost term in Eq. (1), therefore, represents the squared intensity difference between the deformed moving image 200A and the fixed image 200B. This term is minimized when the intensities between the images are matched. The second cost term represents the squared difference between gradient of the fixed image and the gradient of the deformed moving image and is minimized when the differences between the gradients of the two images are matched. The goal of the registration is to find a deformation T( ) that minimizes the objective function in Eq. (1), in order to register the moving image onto the fixed image.

Model of Deformation T( )

The deformation T( ) defines the pixel-wise displacements from the fixed image onto the moving image. At voxel v, $T(v) = [\Delta x(v) + v_x, \Delta y(v) + v_y]^T$, reflecting the displacement along x and y directions, where $v_x$ and $v_y$ are the coordinates of pixel v. There are various methods for determining the deformation T( ), and in this method a B-Spline-based deformable registration model is utilized.

The B-Spline deformation model is implemented using a number of regularly distributed control points 400 to represent the deformation, and the deformation at each pixel 300 can be determined by using B-Spline interpolation. For example, in FIG. 7, the deformations on the pixels 300 are determined by the 4×4 controls points 400.

In the present embodiment, B-splines of order 3 are used as the basis function for the transformation. The cubic b-splines are smooth, $C^2$ continuous and can be easily calculated and provide a good balance between accuracy and computational ease. Along each direction/coordinate, the basis function of the cubic B-Spline is defined as $$\beta(u) = \begin{cases} (1-u)^3/6, & u \in [0, 1] \\ (3u^3 - 6u^2 + 4)/6, & u \in [1, 2] \\ (-3u^3 + 3u^2 + 3u + 1)/6, & u \in [2, 3] \\ u^3/6, & u \in [3, 4] \end{cases} \quad (2)$$

which has a support over 4 grid elements. In Eq. (2), u represents the distance from the starting point of a b-spline basis function. Let $\Box_i$ represent a b-spline basis function starting at control point i, which has a displacement of $c_i$, then the displacement v(x) of the point at any voxel location x is given by:

$$v(x) = \sum_i c_i \beta_i \left( \frac{x}{h_x} - i \right)$$

where, $h_x$ represents the spacing between the control points. The components of v(x) in each direction (x, y- and z-) are calculated using the $c_i$ values of corresponding component.

Optimization of Objective Function

Once the grids of control points 400 are given, the purpose of the registration is to determine the location of every control point 400 so that the interpolated deformation T( ) can minimize the energy function defined in Eq. (1). The optimization method used is gradient descent, and the method to estimate the gradient of energy function is a finite differential method.

When considering the control point c, and its coordinates are $c_x$, $c_y$, the following values are calculated for the energy function, in order to determine the gradient of the objective function, according to the finite differential method:

$$E(c_x, c_y), E(c_x + \delta, c_y), E(c_x - \delta, c_y), E(c_x, c_y + \delta), E(c_x, c_y - \delta)$$

where $\delta$ is a step value. If $E(c_x, c_y)$ is smaller than other values, the control point will not be moved since to remain the same is the best choice. For other cases, the gradient is calculated as follows, $$\frac{\partial E}{\partial c_x} = \frac{E(c_x + \delta, c_y) - E(c_x - \delta, c_y)}{2\delta}$$

$$\frac{\partial E}{\partial c_x} = \frac{E(c_x, c_y + \delta) - E(c_x, c_y - \delta)}{2\delta}$$

Here, only the orientation of the gradients are used, i.e.:

$$\delta c_x = \frac{\partial E}{\partial c_x} \bigg/ \left|\frac{\partial E}{\partial c_x}\right|, \text{ and } \delta c_y = \frac{\partial E}{\partial c_y} \bigg/ \left|\frac{\partial E}{\partial c_y}\right|$$

to update the control point $c_x$, $c_y$ according to the following updating rule:

$$c_x = c_x - \mu \delta c_x$$

$$c_y = c_y - \mu \delta c_y$$

Generally, finite differences are used to approximate the derivatives in a discrete space. The gradient descent approach updates the transformation parameterization based on the direction and magnitude of gradient of cost function with respect to that parameter.

Multi-Resolution Implementation

The proposed image registration method is performed under a multi-resolution framework, in order to obtain more robust registration results and to speed the registration procedure. In this case, the input images F and M (e.g., 200B, 200A, see FIG. 5) are first down-sampled 202A, 202B into several resolutions, denoted as:

$$F \text{-->} F_1 \text{-->} F_2 \text{-->} \ldots$$

$$M \text{-->} M_1 \text{-->} M_2 \text{-->} \ldots$$

Starting from the lowest resolution, the registration 220 is performed as described above, and determine the deformation 250 at that resolution, then, the deformation 250 (i.e. the B-Spline) is up-sampled 252 at that resolution onto a finer level resolution, after up-sampling 252, the registration/optimization 220 is performed on the finer level resolution. This procedure continues until a result 260 at the finest image resolution is obtained. In order to up-sample B-Spline-based deformation from one resolution to a finer resolution, the following two steps may have to be considered:

Up-sample control points: suppose the control point at the current resolution is $c_x$, $c_y$, then the control point at the finer resolution will be $R \cdot c_x$, $R \cdot c_y$, where R is the up-sampling rate.

Insert control points: at a higher resolution, we need to insert more control points in order to reflect details of the deformation.

Adaptive Selection of Control Points

The normal optimization procedure is illustrated in FIG. 6. Initially, the input images intensities are normalized 222. Intensity normalization of the input images is performed as the registration technique assumes that the corresponding regions have same intensities in the two images being registered together. This is not always the case, owing to system errors as well as different fluid concentration in various regions across the images. This problem can be fixed by normalizing the intensities of the images before they are registered. The gradient magnitudes 224 are then calculated to obtain the control points 400. Gradient magnitudes of input images may be calculated by first performing smoothing operation and then calculating the gradients of images. Smoothing may be performed to ensure that the driving function is smooth, well behaved and is not over-sensitive to small local minima.

The control points are iterated all at each resolution and then updated using the above optimization method. Since the image region that has large differences between the fixed image and the moving image is the region that needs to be focused on, additional attention need not be paid to the region with smaller image differences since the images are matched at that region. Thus, in the proposed method, the image regions (or the control points) are classified into two groups, one is the region where the local similarity of the two images is large and one is where the local similarity is small. Then, in each iteration only the control points of the first group are updated and the control points in the second group remain unchanged.

That is, a dynamic image region selection strategy may be utilized that focuses on registering image regions with larger differences, while retains small deformation for image regions with small differences. This helps in faster matching of regions that have large differences and if further speed up is required, one can only focus on large differences and get an even better speed up so that only small intensity differences remain. In this regard, the control points may be adaptively classified into two groups s in each iteration: the ones that drive the deformation and the ones that are fixed. Adaptive classification of the driving control points may be performed by identifying the image regions with larger local least squared errors. Likewise, the selection of the fixed control points in an iteration may be done by identifying the image regions with relatively smaller local least squared errors.

Using this adaptive selection of control points, the following advantages are achieved: improved calculation speed of the algorithm; and artifacts are prevented in the image regions with smaller differences. In the latter regard it is better not to deform the moving images in those regions with smaller image differences as fewer artifacts are introduced.

Summary of the Registration Process

Figure 8:
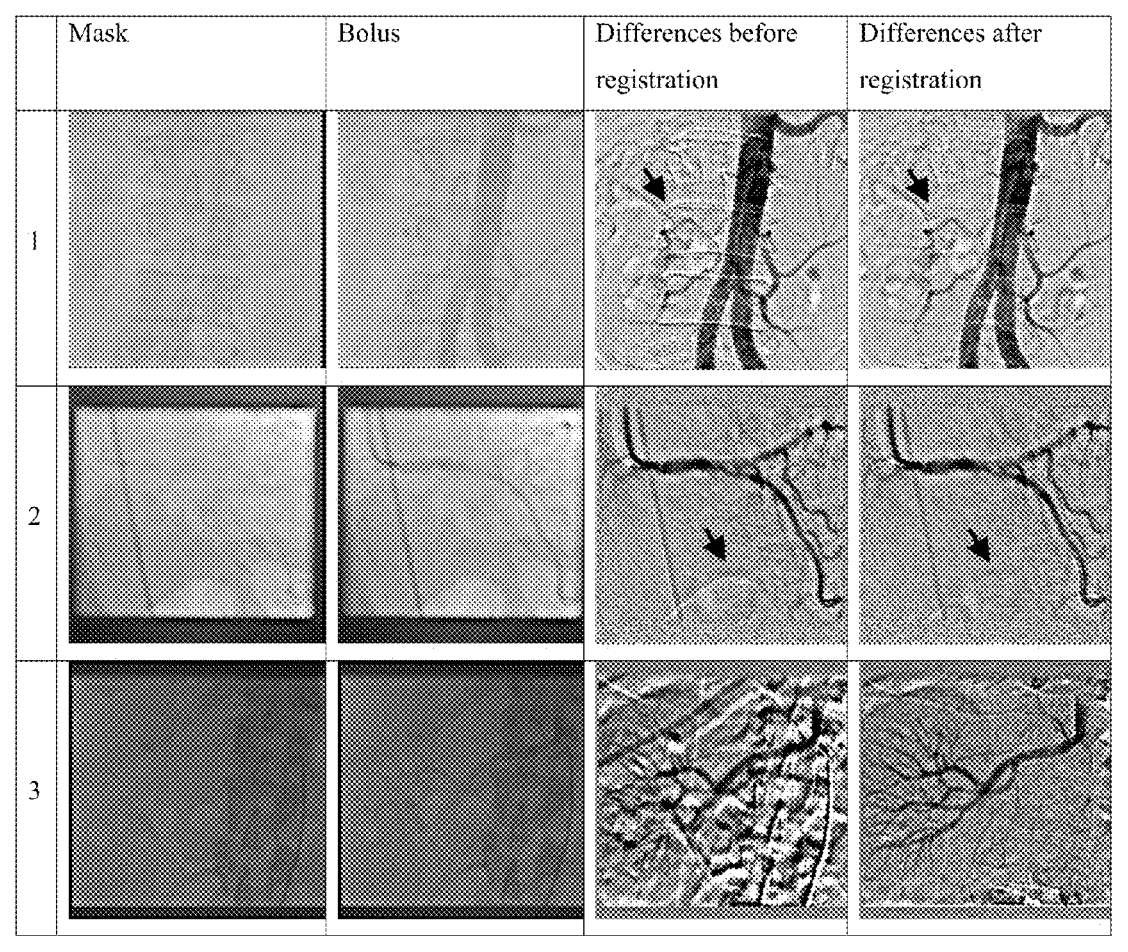

Generally, a hierarchical image registration algorithm is proposed. The algorithm uses adaptive control points to determine the correspondences between two images and uses B-Spline model to interpolate the deformations. Several speed improving strategies have been applied to improve the performance and the speed of the process. These strategies include adaptive control point selection, fast finite differential method. Other strategies are possible and within the scope of the present invention Exemplary Results The registration process was tested in digital subtraction angiography. The presented process was tested over 74 pair of 2-D projection CT images. The pair consisted of projection CT images obtained from different patients before and after injection of contrast enhancement agent. FIG. 8 shows sample registration results for 3 different patients. The first column in each row shows the projection CT image of underlying anatomy structural image before the contrast enhancement dye has reached the field of view. The second column shows the projection CT image of the same field of view after the dye has reached the field of view and the blood vessels are enhanced. In such a setup, it will be expected that the only differences that show up in the subtraction image will be at blood vessels. However, as can be seen from the third column in each row, that there are other artifacts (e.g., vertebrae as shown in row 1 column 3) due mainly to motion of objects in the filed of view. These differences are minimized using the real-time image registration technique. The image in first column was used as the moving image, while the contrast enhanced image was used as the fixed image. The difference image shown in the fourth shows that the artifacts introduced due to motion have been minimized.

In the first and second row, the area of differences due to motion have been pointed with an arrow, which shows that the differences pertaining to motion have been removed by the registration. The third row shows a patient with a relatively large motion and subtraction image is difficult to interpret without registration. Generally, the registration process matches the regions well and removes the motion artifacts and only blood vessels appear in the subtraction image (fourth panel). It can be seen from FIG. 8 that the registration does a good job of matching the objects together by removing the motion artifacts and placing the two images in the same co-ordinate system.

The presented systems and method provide a number of advantages. For instance, the disclosed processed provide a fast and automatic image registration method. The method is real-time and takes only 2-3 seconds for image matching of 512×512 2-D images. This makes it perfectly suitable for on-line application in image guided interventional procedures. The method iteratively matches the images together using gradient descent approach, the rate of image matching is higher in initial iterations and decreases exponentially as the optimal solution is reached, i.e., the total cost after each iteration decreases exponentially with respect to the iterations. If there is a need for further speed-up, the registration can be performed on fewer number of iterations without any noticeable reduction in quality of images. Further, the presented method uses both, image intensities and image intensity gradient as the matching costs. The existing intensity based registration methods register the images based only on intensity. Inclusion of gradient as a similarity cost leads to an improved matching at the edges.

A multi-resolution strategy is used to achieve speed-up as well as to perform better registration. As will be appreciated, a multi-resolution architecture may be used, both in the spatial domain as well as in the degrees of freedom. A multi-resolution framework allows the global differences to be minimized first and then the local differences are minimized as the resolution is increased and more basis functions are used.

Another key of the presented processes is the adaptive selection of control points. The control points are adaptively selected based on the highest driving force. This makes the registration run faster as a result of fewer parameters to be determined. Use of B-spline basis functions helps in keeping the deformation localized and the deformation, while being smooth, does not interfere with the fixed control points beyond the local support of that control point. The localization results in better matching of the images. Further, the control points are sequentially updated, i.e., in the same iteration the search of next control point is based on the previously searched control points. This keeps the deformation model updated all the time and the registration converges faster than the methods which search for control points in parallel.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A method for use in registering medical images in a medical imaging system, comprising:
    obtaining a fixed first image;
    obtaining a second image;
    normalizing the intensity of said first and second images;
    calculating gradient magnitudes of said first and second images;
    applying control point grids to said first and second images, wherein control points of said grids define regions of said first and second images;
    identifying said regions between said images having larger differences in at least one of intensity and gradient magnitude in relation to regions having smaller differences in corresponding intensity or gradient; and
    deforming the fixed first image to the second image, wherein regions having larger differences are utilized to drive deformation between the images, wherein said control points are classified as one that drive deformation and ones that are fixed, wherein said classification is based on at least one of intensity differences and gradient magnitude differences between corresponding control points of said first and second images.

2. The method of claim 1, further comprising:
    after deforming the fixed first image, subtracting a resulting deformed image from the second image.

3. The method of claim 2, wherein identifying comprises performing a least squared error calculation of at least one of intensities and gradient magnitudes for corresponding regions of said images.

4. The method of claim 1, wherein said differences are calculated using a least means calculation.

5. The method of claim 1, wherein said images are ultrasound images.

6. The method of claim 1, wherein said images are x-ray images.

7. The method of claim 1, wherein a B-spline represents a deformation field used to deform said fixed image.

8. The method of claim 1, further comprising:
    down-sampling said images to generate first and second down-sampled images, wherein said steps of normalizing, calculating and identifying are performed on said down-sampled images to determine a deformation for said down-sampled images.

9. The method of claim 8, further comprising:
    up-sampling the deformation and using said up-sampled deformation for registering said first fixed image and said second image.

* * * * *